United States Patent
Tsukamoto et al.

(10) Patent No.: US 8,654,424 B2
(45) Date of Patent: Feb. 18, 2014

(54) MULTIBEAM DEFLECTOR FOR SEPARATING BEAMS OUTPUT FROM OPTICAL DEFLECTION DEVICES

(75) Inventors: Kazuhiko Tsukamoto, Kanagawa (JP); Shuichi Suzuki, Kanagawa (JP); Tsuyoshi Hashiguchi, Kanagawa (JP); Atsushi Sakai, Kanagawa (JP); Koichiro Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 277 days.

(21) Appl. No.: 12/880,406

(22) Filed: Sep. 13, 2010

(65) Prior Publication Data
US 2011/0063705 A1   Mar. 17, 2011

(30) Foreign Application Priority Data

Sep. 15, 2009  (JP) ................................. 2009-212927
Sep. 13, 2010  (JP) ................................. 2010-203939

(51) Int. Cl.
  *G02B 26/08*  (2006.01)
  *G02F 1/295*  (2006.01)
(52) U.S. Cl.
  USPC ............... 359/204.1; 385/8; 385/33; 385/129
(58) Field of Classification Search
  USPC .......... 359/201.1, 201.2, 204.1, 205.1, 209.1, 359/212.1; 385/8, 10, 33, 36, 129–132
  See application file for complete search history.

(56) References Cited

U.S. PATENT DOCUMENTS

| | | | | |
|---|---|---|---|---|
| 3,954,323 A | * | 5/1976 | Andrews et al. | 385/8 |
| 4,762,383 A | | 8/1988 | Yamashita et al. | |
| 5,122,894 A | * | 6/1992 | Grantham | 359/245 |
| 5,208,800 A | * | 5/1993 | Isobe et al. | 369/112.27 |
| 5,528,717 A | * | 6/1996 | Schwering et al. | 385/129 |
| 5,812,707 A | * | 9/1998 | Yamane et al. | 385/11 |
| 6,385,355 B1 | * | 5/2002 | Nashimoto et al. | 385/8 |
| 6,556,531 B1 | * | 4/2003 | Yagi et al. | 369/103 |
| 6,810,160 B2 | * | 10/2004 | Sugama et al. | 385/14 |
| 6,873,751 B2 | * | 3/2005 | Nishizawa et al. | 385/8 |
| 8,396,339 B2 | * | 3/2013 | Mukawa et al. | 385/31 |
| 2003/0108264 A1 | * | 6/2003 | Nishizawa et al. | 385/8 |
| 2003/0228088 A1 | * | 12/2003 | Liu | 385/16 |
| 2005/0084196 A1 | * | 4/2005 | Aoki | 385/8 |

FOREIGN PATENT DOCUMENTS

| | | | | |
|---|---|---|---|---|
| JP | 57088413 A | * | 6/1982 | ............. G02B 5/172 |
| JP | 58-125023 | | 7/1983 | |
| JP | 58-130327 | | 8/1983 | |
| JP | 59-192232 | | 10/1984 | |
| JP | 62-047627 | | 3/1987 | |

* cited by examiner

*Primary Examiner* — Frank Font
(74) *Attorney, Agent, or Firm* — IPUSA, PLLC

(57) ABSTRACT

A multibeam deflector includes a plurality of optical deflection devices formed on a single substrate and an output optical system. Each of the optical deflection devices includes a slab optical waveguide formed by a material having an electro-optic effect. The output optical system is configured to separate beams output from the optical deflection devices from each other.

20 Claims, 13 Drawing Sheets

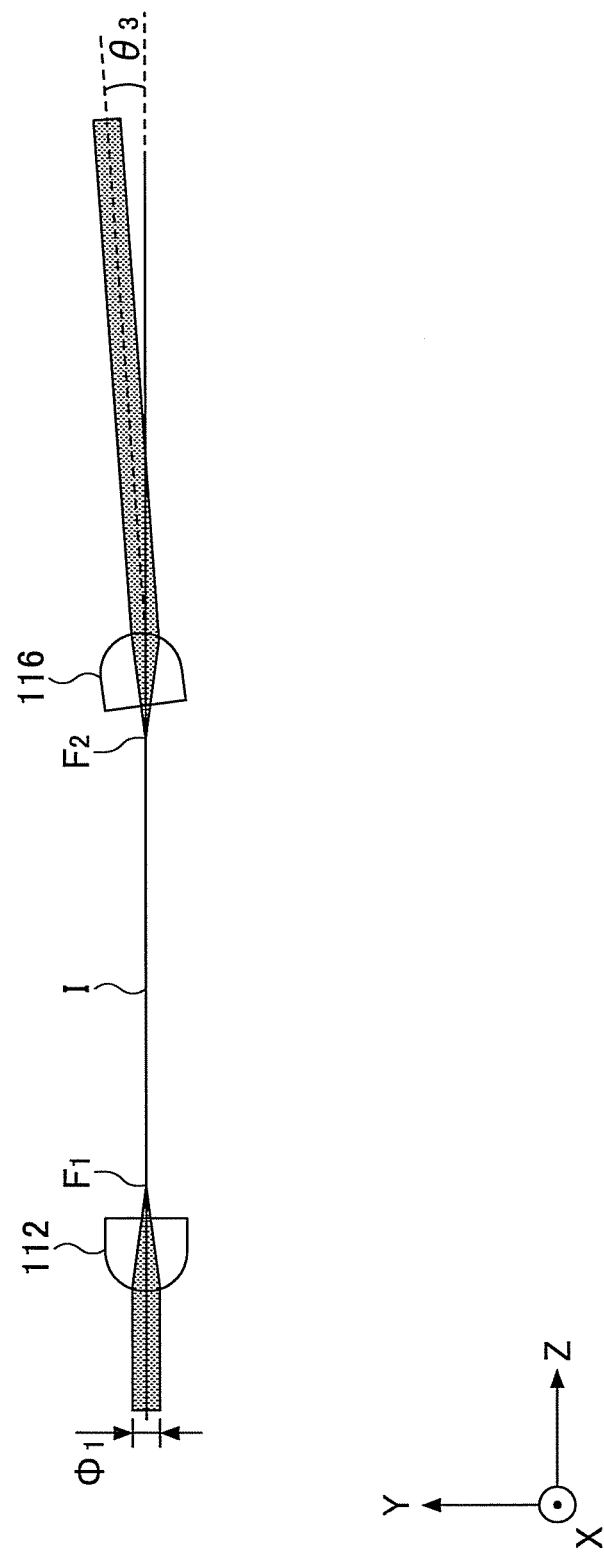

MULTIBEAM DEFLECTOR FOR SEPARATING BEAMS OUTPUT FROM OPTICAL DEFLECTION DEVICES

BACKGROUND OF THE INVENTION

1. Field of the Invention

The present invention relates to optical devices and, more particularly, to a multibeam deflector having a plurality of optical deflection devices.

2. Description of the Related Art

Optical deflectors are classified into a mechanically-operated optical deflector, such as a vibration galvanometer or a polygon mirror, and a non-mechanically-operated optical deflector, such as an acousto-optic device and an electro-optic device. The mechanically-operated optical deflector has been used practically in many laser printers and barcode readers. However, the mechanically-operated optical deflector includes a mechanically-operated part, which may cause a problem in achieving a high-speed operation and high integration. Thus, the application range of the mechanically-operated optical deflector is limited.

On the other hand, the non-mechanically-operated optical deflector does not include a mechanically-operated part, and is controlled optically or using electric signals. The non-mechanically-operated optical deflector is suitable in achieving a high-speed operation and also has an advantage that an optical system incorporated therein can be made compact. Thus, practical use of the non-mechanically-operated optical deflector is expected.

However, there is a problem in that the non-mechanically-operated optical deflector is capable of performing optical deflection in only a single direction. For example, Japanese Laid-Open Patent Applications No. 59-192232 and No. 62-47627 disclose an optical device or optical deflector, which can perform an optical deflection within a plane parallel to a waveguide. This optical device or optical deflector deflects a light, which is transmitted in a waveguide, according to an acousto-optic effect or an electro-optic effect, and causes the deflected light to exit through a prism or a grating. However, the optical device or optical deflector deflects the light only in a single direction. In order to acquire optical deflection in a plurality of directions by using a generally-used non-mechanically-operated optical deflector, a structure which combines an optical deflector and an optical system is needed. However, a system size of a non-mechanically-operated optical deflector having such a structure may be increased inevitably.

Japanese Laid-Open Patent Application No. 58-125023 discloses a technique to cause a non-mechanically-operated optical deflector to deflect a light in a plurality of directions. According to this technique, a light transmitting in a waveguide can be deflected within an optical waveguide plane according to an acousto-optic effect, and the light transmitting in the waveguide can also be deflected in a direction perpendicular to the waveguide plane by changing a refraction index of the waveguide near an end surface of the waveguide according to a thermo-optic effect. Further, Japanese Laid-Open Patent Application No. 58-130327 also disclose a technique to deflect a light within an optical waveguide plane and also deflect the light in a direction perpendicular to the optical waveguide plane by changing a refraction index of a portion, in which an exit grating is formed, according to an electro-optic effect. These techniques can be used in principle to deflect a light into a plurality of directions.

However, the above-mentioned conventional techniques use an acousto-optic effect in deflecting a light within a plane parallel to an optical waveguide, and also use a thermo-optic effect or an electro-optic effect in deflecting a light in a direction perpendicular to an optical waveguide plane. The deflection according to an acousto-optic effect has a problem in that a deflection angle is extremely small and a response speed is low. The deflection according to a thermo-optic effect or an electro-optic effect has a problem in that a deflection angle is extremely small.

As mentioned above, a conventional non-mechanically-operated optical deflector is capable of deflecting a light only in a single direction. Additionally, even if the conventional non-mechanically-operated optical deflector is capable of deflecting a light in a plurality of directions, the deflection angle is not sufficient in practical use.

SUMMARY OF THE INVENTION

It is a general object of the present invention to provide a multibeam deflector in which the above-mentioned problems are eliminated.

A more specific object of the present invention is to provide a multibeam deflector which is capable of deflecting a plurality of beams in a plurality of directions and deflecting the beams at angles sufficiently large for practical use.

In order to achieve the above-mentioned objects, there is provided according to the present invention a multibeam deflector comprising: a plurality of optical deflection devices formed on a single substrate, each of the optical deflection devices including a slab optical waveguide formed by a material having an electro-optic effect; and an output optical system configured to separate beams output from the optical deflection devices from each other.

According to the present invention, a plurality of deflected beams exiting from the optical deflection devices formed in the same substrate can be deflected in a plurality of directions through the output optical system. Thus, according to the present invention, a non-mechanically-operated optical deflector, which is capable of performing optical deflection in a plurality of directions and providing a deflection angle sufficient for practical use, can be achieved. The present invention is applicable to a two-dimensional scanner using a multibeam deflector (non-mechanically-operated deflector) and also to a multibeam deflection module.

Other objects, features and advantages of the present invention will become more apparent from the following detailed description when read in conjunction with the accompanying drawings.

BRIEF DESCRIPTION OF THE DRAWINGS

FIG. 3C is a further illustration of the optical system of the multibeam deflector illustrated in FIGS. 2A through 2C;

DETAILED DESCRIPTION OF THE PREFERRED EMBODIMENTS

A description will be given below, with reference to the drawings, of embodiments of the present invention.

(First Embodiment)

Figure 1A:
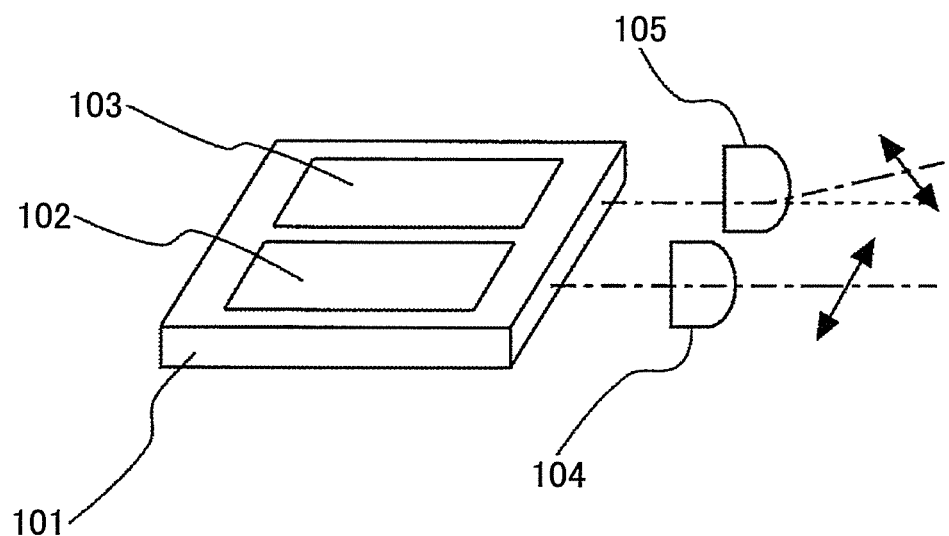
FIG. 1A is an illustrative perspective view of a multibeam deflector according to a first embodiment of the present invention.
Figure 1B:
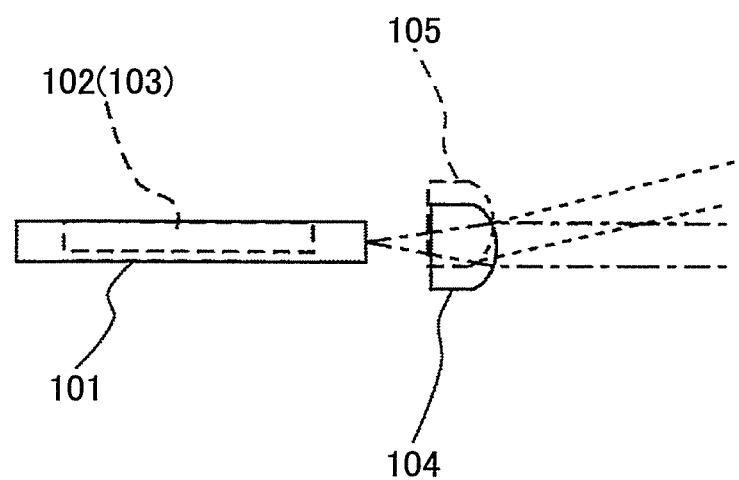
FIG. 1B is an illustrative cross-sectional view of the multibeam deflector according to the first embodiment of the present invention.

FIG. 1A is an illustrative perspective view of a multibeam deflector according to a first embodiment of the present invention. FIG. 1B is an illustrative cross-sectional view of the multibeam deflector according to the first embodiment of the present invention.

In the multibeam deflector according to the present embodiment, a plurality of cylindrical lenses are located at positions shifted from a plurality of optical waveguides, respectively, to achieve deflection of a plurality of light beams in a plurality of directions.

The multibeam deflector illustrated in FIGS. 1A and 1B includes a plurality of optical deflection devices provided in a single substrate 101. The optical deflection devices include optical waveguides 102 and 103, respectively. A plurality of cylindrical lenses 104 and 105 serving as an output optical system are located at the subsequent stage of the optical deflection devices. Each of the optical waveguides 102 and 103 is, for example, a slab waveguide formed by a material having an electro-optic effect. Each of the optical waveguides 102 and 103 may be provided with electrodes.

The cylindrical lenses 104 and 105, which constitute an output optical system, are arranged at positions to collimate light beams. The cylindrical lenses 104 and 105 are also arranged so that the positions of the cylindrical lenses 104 and 105 in a direction perpendicular to each of the optical waveguides 102 and 103 are different from each other. Each of the cylindrical lenses 104 and 105 at the subsequent stage of the optical waveguides 102 and 103 (optical deflection devices) serves as a collimate lens which squeezes a beam size. In addition, in the above-mentioned arrangement, the beams emitted from the optical waveguides 102 and 103 are given different diffraction angles because the incident angles of the light beams on the cylindrical lenses 104 and 105 are different.

Thus, it is possible to acquire a desired exit angle for each beam by adjusting the positions of the cylindrical lenses 104 and 105. Additionally, it is also possible to acquire a desired exit angle for each beam by changing angles of the cylindrical lenses 104 and 105 relative to the optical axes of the optical waveguides 102 and 103, respectively. Further, it is possible to control a deflection angle for each beam by applying a voltage independently to each of the optical waveguides 102 and 103.

Figure 2A:
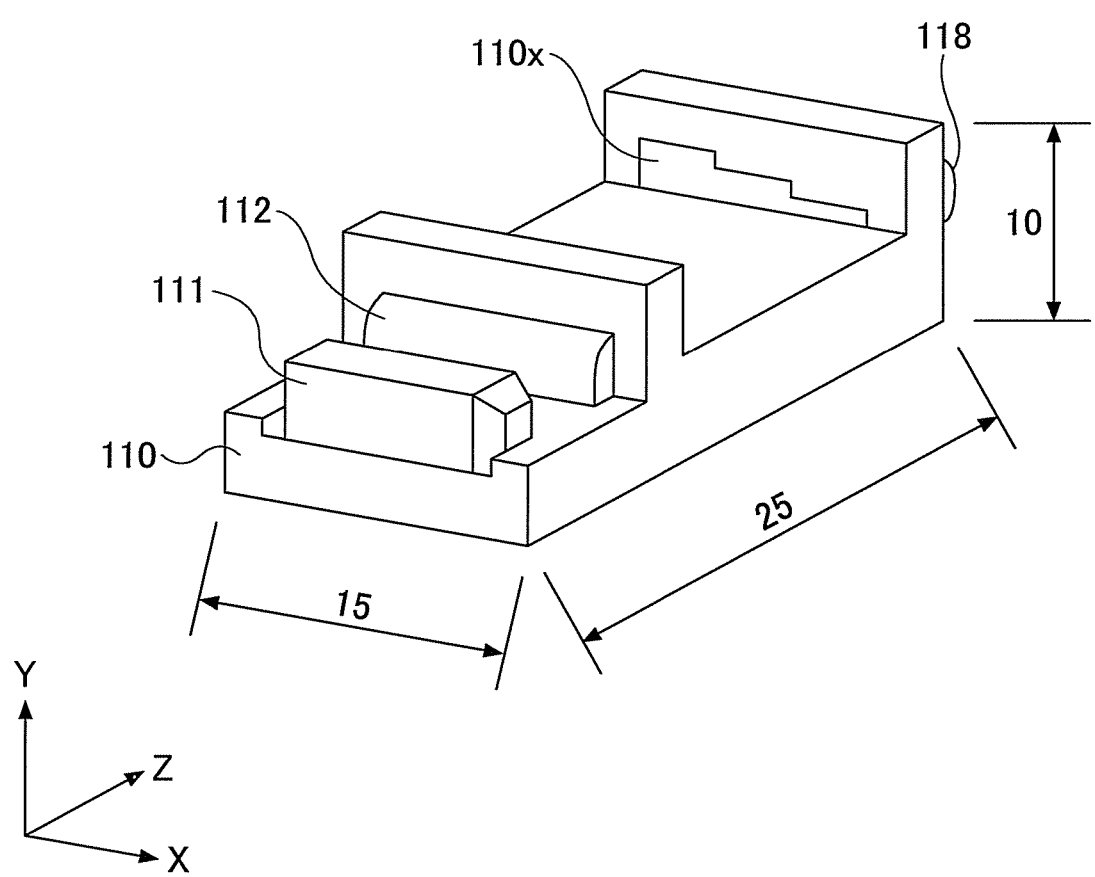
FIG. 2A is a perspective view of a multibeam deflector used in a simulation.
Figure 2B:
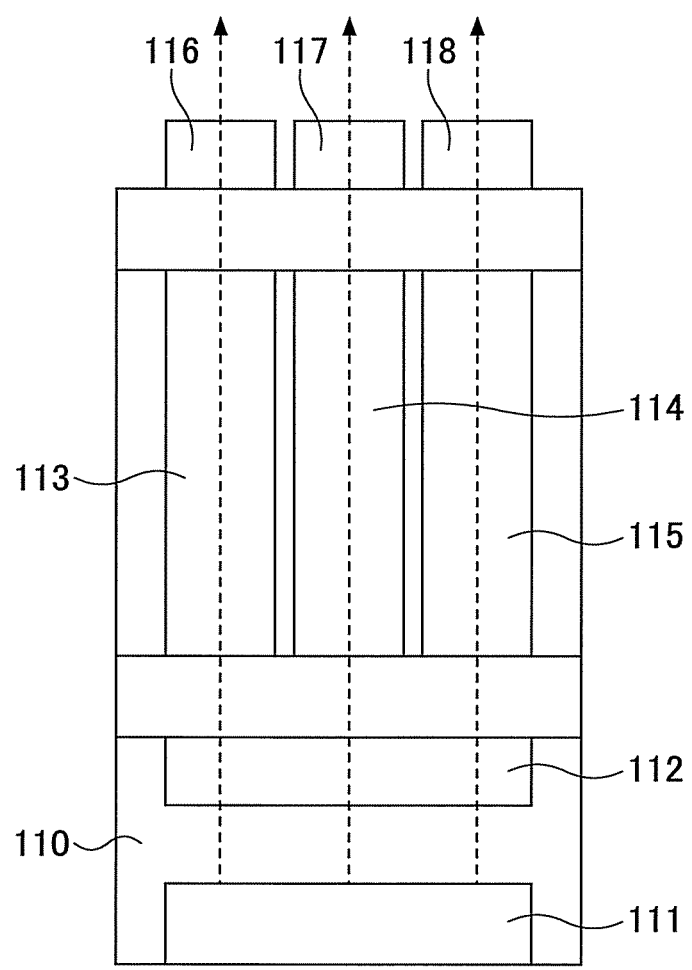
FIG. 2B is a plan view of the multibeam deflector used in the simulation.
Figure 2C:
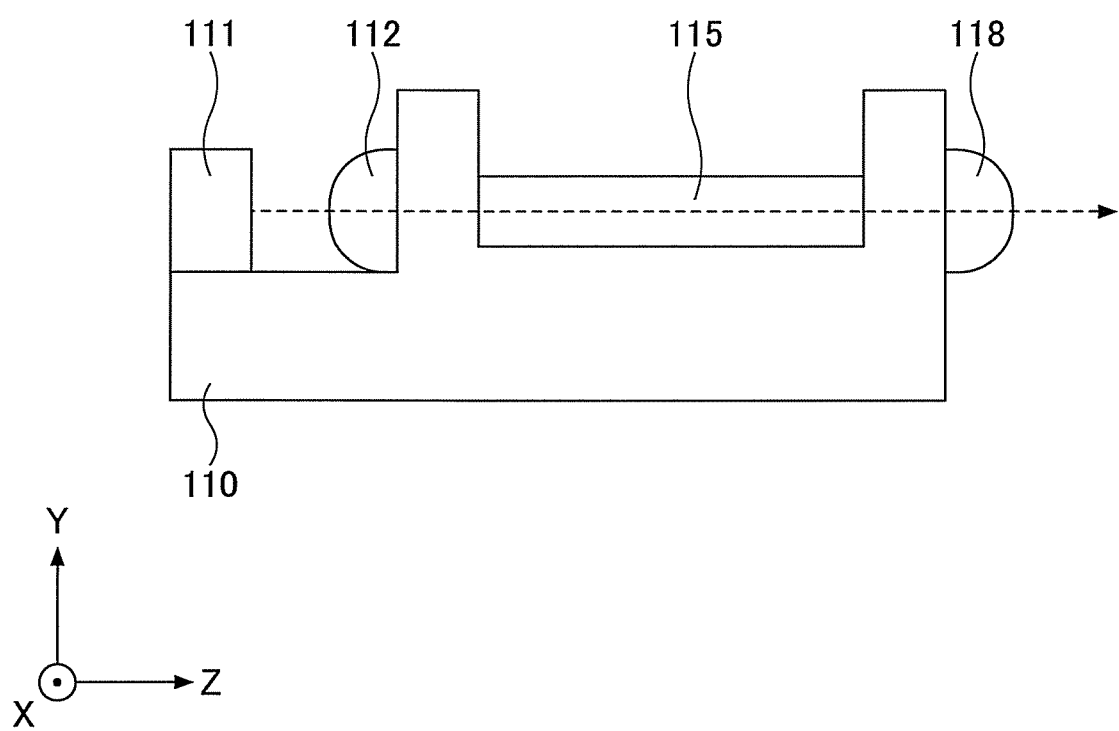
FIG. 2C is a side view of the multibeam deflector used in the simulation.

A description will be given below of a result of simulation performed on the multibeam deflector according to the present embodiment. FIG. 2A is a perspective view of a multibeam deflector used in the simulation. FIG. 2B is a plan view of the multibeam deflector used in the simulation. FIG. 2C is a side view of the multibeam deflector used in the simulation.

The multibeam deflector illustrated in FIGS. 2A through 2C utilizes a refraction angle of a cylindrical lens. The multibeam deflector includes a substrate 111 and a light source 111, a coupling lens 112, wave guides 113, 114 and 115, and focus lenses 116, 117 and 118 that are mounted on the substrate 111. The multibeam deflector illustrated in FIGS. 2A through 2C has a maximum outside dimension of 15 mm measured in an X direction, a maximum outside dimension of 10 mm measured in a Y direction, and a maximum outside dimension of 25 mm in a Z direction. In FIG. 2A, illustration of the optical waveguides 113, 114 and 115 is omitted for the sake of simplification.

The light source 111 is equipped with three laser emitters arranged at equal intervals along an X-axis extending in the X direction. The coupling lens 112 is a cylindrical lens having a focal distance f=3.9 mm and a radius of curvature R=2.0 mm. The coupling lens 112 is arranged at a preceding stage of the optical waveguides 113, 114 and 115 so that a convex surface of the cylindrical lens faces the light source 111 and a flat surface of the cylindrical lens faces the optical waveguides 113, 114 and 115. The laser beams emitted from the light source 111 are incident on the convex surface of the coupling lens 112.

Each of the focus lenses 116, 117 and 118 is a cylindrical lens having a focal distance f=3.9 mm and a radius of curvature R=2.0 mm. The focus lens 112 is arranged at a subsequent stage of the optical waveguides 113, 114 and 115 so that a flat surface of the cylindrical lens faces the optical waveguides 113, 114 and 115 and a convex surface of the cylindrical lens faces an opposite side. The laser beams exiting from the optical waveguides 113, 114 and 115 are incident on the flat surface of the focus lenses 116, 117 and 118, respectively. The focus lenses 116, 117 and 118 are fitted in a stepped through opening 110x so that a position in the Y direction (perpendicular to the optical axis), a position in the Z direction (parallel to the optical axis) and a rotational position relative to the optical axis can be adjusted independently.

The three laser beams emitted from the light source 111 are collimated by the coupling lens 112 into laser beams of a diameter of 1.2 mm, and are incident on the optical waveguides 113, 114 and 115, respectively. The laser beams passed through and exited from the optical waveguides 113, 114 and 115 are collimated again by the focus lenses 116, 117 and 118, respectively. The laser beams exited from the focus lenses 116, 117 and 118 must have a difference in exit angles by at least 4.4 degrees. Additionally, each of the laser beams exited from the focus lenses 116, 117 and 118 must have a beam spread angle sufficient for performing seamless scanning.

Figure 3A:
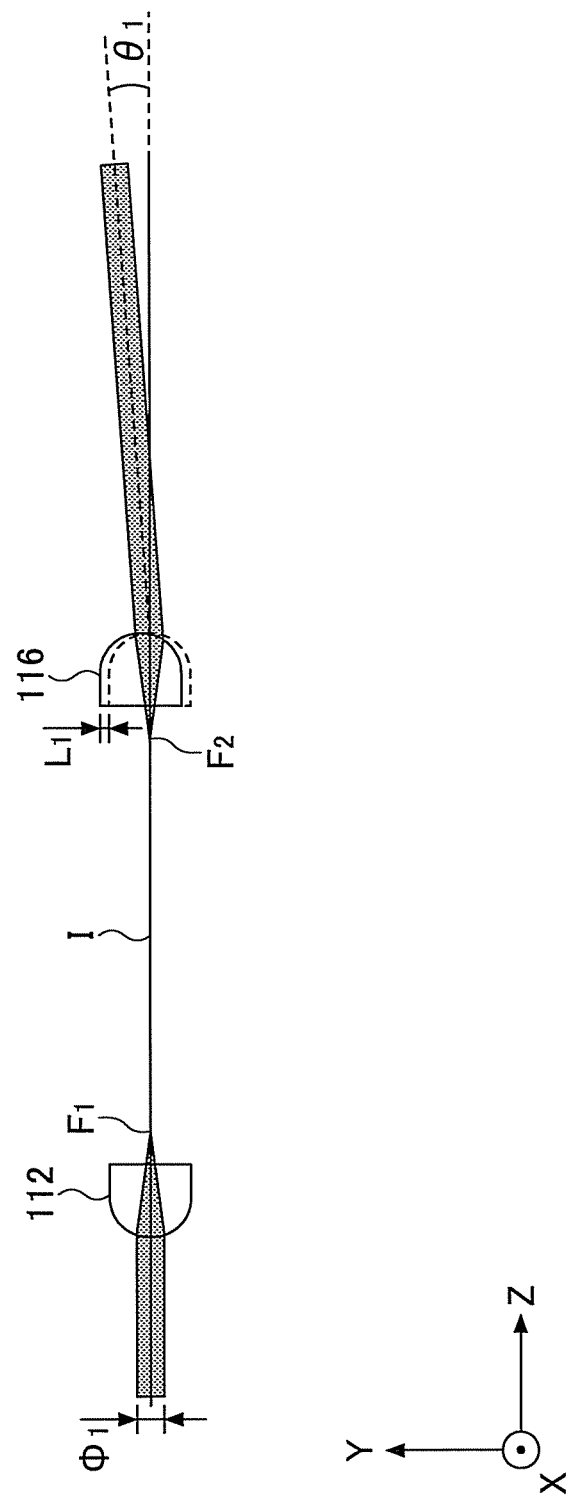
FIG. 3A is an illustration of an optical system of the multibeam deflector illustrated in FIGS. 2A through 2C.
Figure 3B:
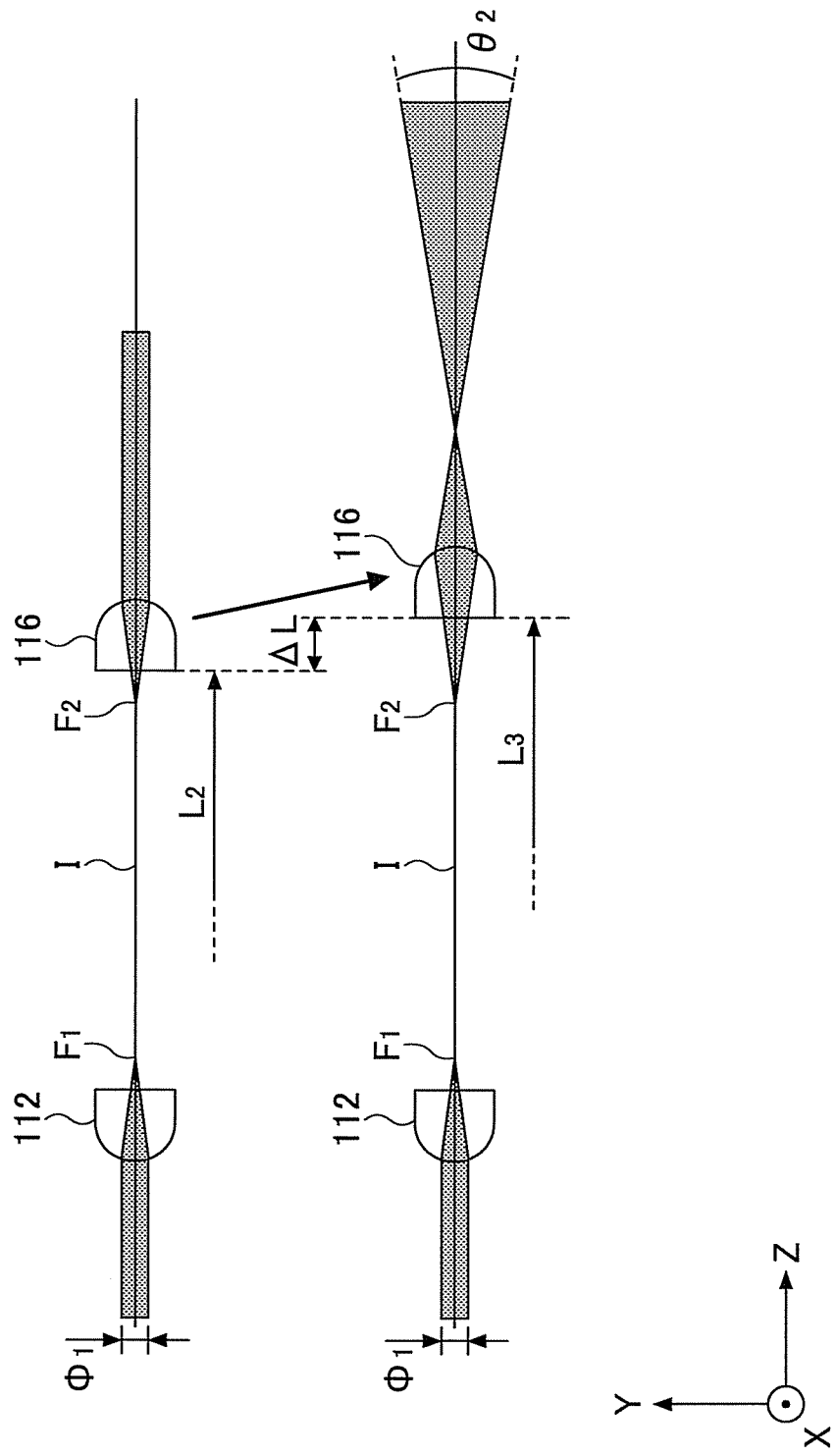
FIG. 3B is another illustration of the optical system of the multibeam deflector illustrated in FIGS. 2A through 2C.

FIGS. 3A, 3B and 3C are illustrations of the optical system of the optical deflector illustrated in FIGS. 2A, 2B and 2C for explaining a principle of an operation of the optical system. A description will be given with respect to the focus lens 116 as a representative, and the same operation is performed by the focus lenses 117 and 118.

In FIGS. 3A, 3B and 3C, F1 and F2 indicate focal points of the coupling lens 112 and the focus lens 116, respectively, and I indicates the optical axis. The laser beam incident on the coupling lens 112 is collimated into a complete circle having a diameter $\phi 1=1.2$ mm.

FIG. 3A illustrates a case where the position of the focus lens 116 is changed in the Y direction (a direction perpendicular to the optical axis I). As illustrated in FIG. 3A, when the position of the focus lens 116 is shifted from the optical axis I by a distance L1=0.295 mm in the Y direction, the exit angle of the laser beam output from the focus lens 116 is shifted by $\theta 1=4.4°$. This amount of shift is sufficient for a position adjustment of the focus lens 116 when assembling the multibeam deflector.

FIG. 3B illustrates a case where the position of the focus lens 116 is changed in the Z direction (a direction parallel to the optical axis I). In this case, the focus lens 116 is not shifted in the Y direction. As illustrated in an upper part of FIG. 3B, the focus lens 116 is at a position shifted from a light emitting point of the light source 11 as an original point by a distance L2=66.47 mm. In a lower part of FIG. 3B, the focus lens 116 is shifted by $\Delta L=3.03$ mm in the Z direction, and also shifted from the light emitting point of the light source 111 by a distance L3=66.95 mm. As a result, the spread angle $\theta 2$ of the laser beam becomes about 8 degrees)($\theta 2=8°$). This spread angle is sufficient for preventing a dead zone (an area where scan cannot be performed) form being generated between adjacent two laser beams having exit angles different by 4.4 degrees.

FIG. 3C illustrates a case where a tilt of the focus lens 116 with respect to the optical axis I is changed. In this case, the focus lens 116 is not shifted in the Y direction and Z direction. In FIG. 3C, the focus lens 116 is rotated by an angle of 6.8 degrees with respect to the optical axis I. As a result, the exit angle $\theta 3$ of the laser beam output from the focus lens 116 is shifted by an angle of 4.4 degrees. This amount of shift is sufficient for a position adjustment of the focus lens 116 when assembling the multibeam deflector. It should be noted that the exit angle and the spread angle of the laser beam may be controlled by combining the shifts of the focus lens 116 illustrated in FIGS. 3A, 3B and 3C.

As mentioned above, in the multibeam deflector according to the present embodiment, the output optical system includes a plurality of optical systems each containing a lens having a convex surface and a flat surface in order to control spread angles of beams output from optical deflection devices. Then, adjacent two optical systems among the plurality of optical systems can be arranged at relatively different positions shifted in a direction perpendicular to or parallel to the optical axis of the incident beams so that a difference between the exit angles of the beams output from the optical systems is an angle larger than zero degree and equal to or smaller than 5 degrees (for example, 4.4 degrees) and the spread angle of each of the beams is an angle larger tan zero degree and equal to or smaller than 10 degrees (for example, 8 degrees). A distance between positions of the adjacent two optical systems can be within 1 mm in the direction perpendicular to the optical axis (for example, 0.295 mm) and within 5 mm in the direction parallel to the optical axis (for example, 3.03 mm).

As mentioned above, in the present embodiment, desired exit angles can be acquired by arranging the cylindrical lenses 104 and 105 on the output side of the optical waveguides 102 and 103 (optical deflection devices). Thus, the multibeam deflector according to a non-mechanical-optical deflection device can be achieved.

(Second Embodiment)

Figure 4:
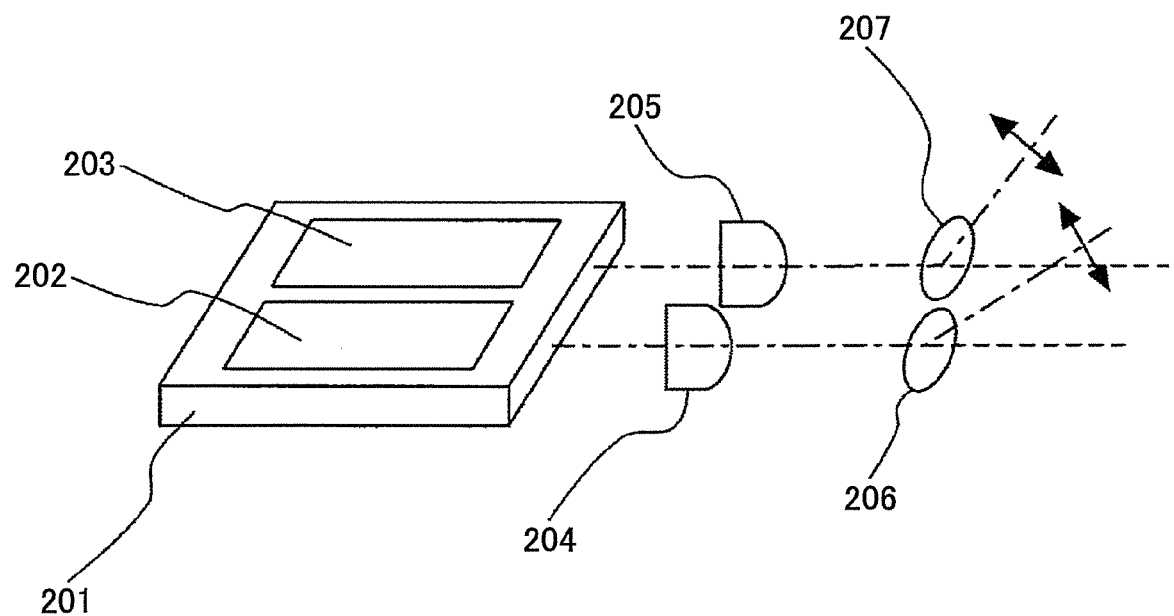
FIG. 4 is an illustrative perspective view of a multibeam deflector according to a second embodiment of the present invention.

FIG. 4 is an illustrative perspective view of a multibeam deflector according to a second embodiment of the present invention. The multibeam deflector according to the second embodiment is achieved by arranging mirrors, which have different reflection angles, at a subsequent stage of cylindrical lenses as an output optical system.

Similar to the multibeam deflector illustrated in FIGS. 1A and 1B, the multibeam deflector according to the present embodiment includes a plurality of optical deflection devices provided in a single substrate 201. The optical deflection devices include optical waveguides 202 and 203, respectively. Cylindrical lenses 204 and 205 are arranged as an output optical system at a subsequent stage of the optical waveguides 202 and 203. In the present embodiment, mirrors 206 and 207 are arranged at a subsequent stage of the cylindrical lenses 204 and 205 so that reflection angles of the mirrors 206 and 207 are different from each other. Thereby, a desired exit angle can be acquired for each beam by adjusting the reflection angle of each of the mirrors 206 and 207.

In the present embodiment, the cylindrical lenses 204 and 205 may be a common single component because an adjustment of the exit angle of each beam is performed by each of the mirrors 206 and 207. Moreover, similar to the first embodiment, each of the optical waveguides 202 and 203, which constitutes an optical deflection device, can be a slab optical waveguides formed by a material having an electro-optic effect.

As mentioned above, in the present embodiment, desired exit angles can be acquired by arranging the cylindrical lenses 204 and 205 on the output side of the optical waveguides 202 and 203 (optical deflection devices) and further arranging the mirrors 206 and 207 on the subsequent stage of the cylindrical lenses 204 and 205. Thus, the multibeam deflector according to a non-mechanical-optical deflection device can be achieved.

(Third Embodiment)

Figure 5:
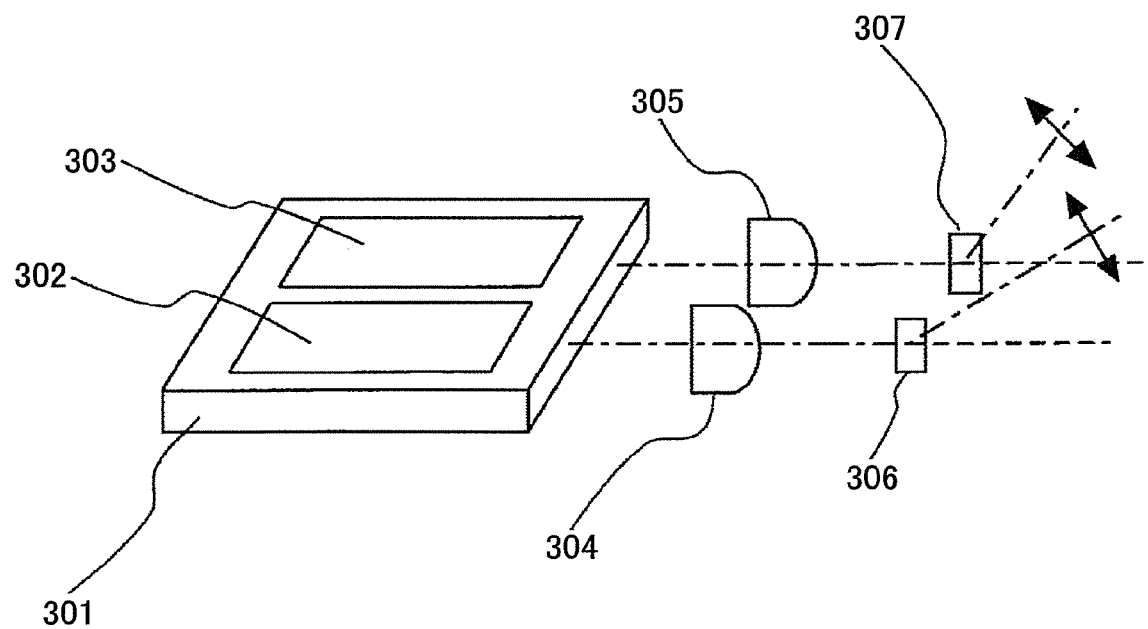
FIG. 5 is an illustrative perspective view of a multibeam deflector according to a third embodiment of the present invention.

FIG. 5 is an illustrative perspective view of a multibeam deflector according to a third embodiment of the present invention. The multibeam deflector according to the third embodiment is achieved by arranging diffraction gratings, which have different diffraction angles, at a subsequent stage of cylindrical lenses as an output optical system.

Similar to the multibeam deflector illustrated in FIGS. 1A and 1B, the multibeam deflector according to the present embodiment includes a plurality of optical deflection devices provided in a single substrate 301. The optical deflection devices include optical waveguides 302 and 303, respectively. Cylindrical lenses 304 and 305 are arranged as an output optical system at a subsequent stage of the optical waveguides 302 and 303. In the present embodiment, diffraction gratings 306 and 307 are arranged at a subsequent stage of the cylindrical lenses 304 and 305 so that diffraction angles of the diffraction gratings 306 and 307 are different from each other. Thereby, a desired exit angle can be acquired for each beam by adjusting the diffraction angle of each of the diffraction gratings 306 and 307 by changing diffraction pitches of the diffraction gratings 306 and 307 or wavelengths of light sources.

The diffraction gratings 306 and 307 may be integrated into a single optical component having different diffraction pitches for the respective beams. Alternatively, the grating angles may be changed by using diffraction gratings having the same structure and different light sources.

In the present embodiment, the cylindrical lenses 304 and 305 may be a common single component because an adjustment of the exit angle of each beam is performed by each of the diffraction gratings 306 and 307. Moreover, similar to the first embodiment, each of the optical waveguides 302 and 303, which constitutes an optical deflection device, can be a slab optical waveguides formed by a material having an electro-optic effect.

As mentioned above, in the present embodiment, desired exit angles can be acquired by arranging the cylindrical lenses 304 and 305 on the output side of the optical waveguides 302 and 303 (optical deflection devices) and further arranging the diffraction gratings 306 and 307 on the subsequent stage of the cylindrical lenses 304 and 305. Thus, the multibeam deflector according to a non-mechanical-optical deflection device can be achieved.

(Fourth Embodiment)

Figure 6:
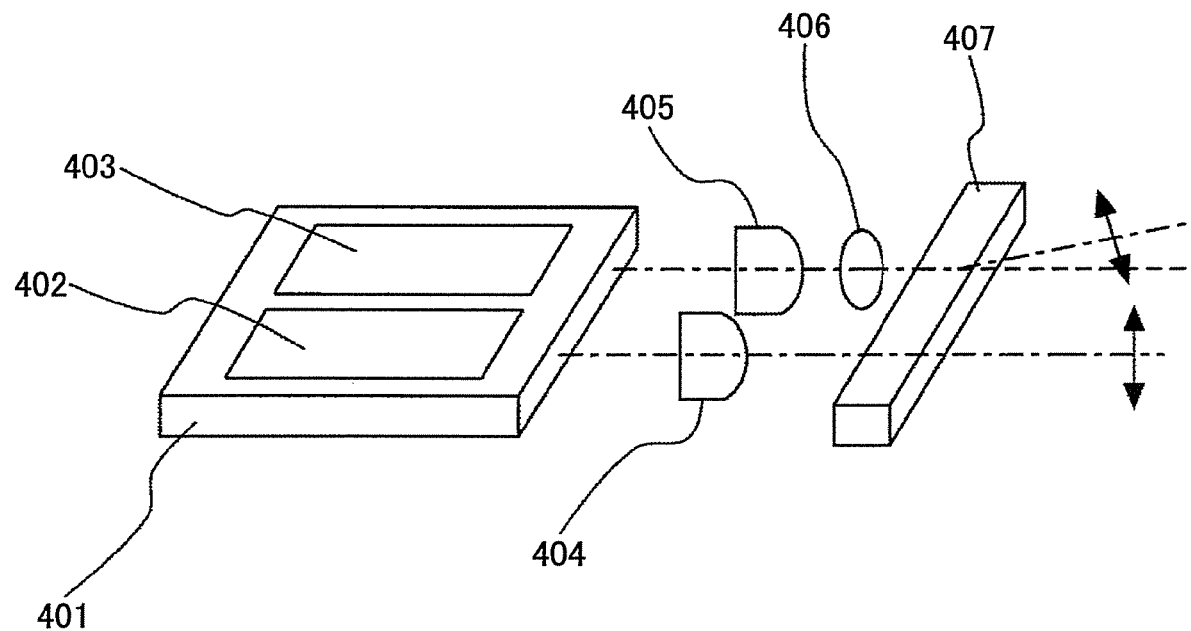
FIG. 6 is an illustrative perspective view of a multibeam deflector according to a fourth embodiment of the present invention.

FIG. 6 is an illustrative perspective view of a multibeam deflector according to a fourth embodiment of the present invention. The multibeam deflector according to the fourth embodiment is achieved by arranging a polarization rotation device and a polarization prism at a subsequent stage of cylindrical lenses as an output optical system.

Similar to the multibeam deflector illustrated in FIGS. 1A and 1B, the multibeam deflector according to the present embodiment includes a plurality of optical deflection devices provided in a single substrate 401. The optical deflection devices include optical waveguides 402 and 403, respectively. Cylindrical lenses 404 and 405 are arranged as an output optical system at a subsequent stage of the optical waveguides 402 and 403. In the present embodiment, a polarization rotation device 406 and a polarization prism 407 are arranged at a subsequent stage of the cylindrical lenses 404 and 405.

For example, the polarization rotation device 406 is arranged at the subsequent stage of the cylindrical lens 405. The polarization prism 407 is arranged at the subsequent stage of the polarization rotation device 406 and the cylindrical lens 404. Because the beam of which polarization is controlled by the polarization rotation device 406 is given a specific refraction index by the polarization prism 407, a desired exit angle can be acquired by the combination of the polarization rotation device 406 and the polarization prism 407. The polarization rotation device 406 may be arranged at an input side of the optical deflection devices (the optical waveguides 402 and 403).

In the present embodiment, the cylindrical lenses 404 and 405 may be a common single component because an adjustment of the exit angle of each beam is performed by the polarization rotation device 406 and the polarization prism 407. Moreover, similar to the first embodiment, each of the optical waveguides 402 and 403, which constitutes an optical deflection device, can be a slab optical waveguides formed by a material having an electro-optic effect.

As mentioned above, in the present embodiment, desired exit angles can be acquired by arranging the cylindrical lenses 404 and 405 on the output side of the optical waveguides 402 and 403 (optical deflection devices) and further arranging the polarization rotation device 406 and the polarization prism 407 at the subsequent stage of the cylindrical lenses 404 and 405. Thus, the multibeam deflector according to a non-mechanical-optical deflection device can be achieved.

In the multibeam deflector having the above-mentioned structure, a subwavelength surface (SWS) grating may be used as the output optical system of the optical deflection devices to achieve the same function as mentioned above. The SWS grating is a grating having a subwavelength structure having a grating period shorter than a wavelength of light. The SWS is given an optical anisotropy and a diffraction index distribution by a simple cross-sectional shape without generating higher-order diffraction waves. Thus, a diffraction index distribution and a polarization property are given to a surface nano-structure of the SWS grating, which gives to the SWS grating the same functions as the above-mentioned polarization rotation device and the polarization prism.

(Fifth Embodiment)

Figure 7:
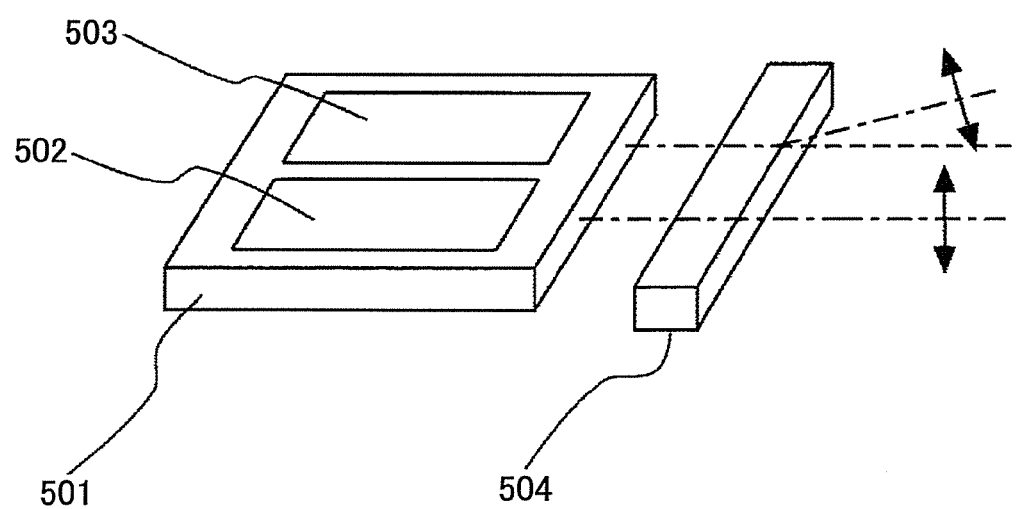
FIG. 7 is an illustrative perspective view of a multibeam deflector according to a fifth embodiment of the present invention.

FIG. 7 is an illustrative perspective view of a multibeam deflector according to a fifth embodiment of the present invention. The multibeam deflector according to the fifth embodiment is achieved by arranging a refraction index distribution lens at a subsequent stage of cylindrical lenses as an output optical system.

Similar to the multibeam deflector illustrated in FIGS. 1A and 1B, the multibeam deflector according to the present embodiment includes a plurality of optical deflection devices provided in a single substrate 501. The optical deflection devices include optical waveguides 502 and 503, respectively. A refraction distribution lens 504 is arranged as an output optical system at a subsequent stage of the optical waveguides 502 and 503. The refraction index distribution lens 504 has different refraction index slopes for the respective optical deflection devices. Thus, desired exit angles can be acquired by setting the refraction angles of the beams output from the optical waveguides 502 and 503 by changing the refraction indexes at portions of the refraction index distribution lens 504 where the respective beams are passed.

In FIG. 7, the refraction index distribution lens 504 has both the condensing function and the refraction index distributing function. A wedge-shaped prism may be arranged at a subsequent stage of the refraction index distribution lens 504 in order to acquire a desired exit angle. The above-mentioned SWS grating may be used to achieve the above-mentioned functions of the refraction index distribution lens 504. Similar to the first embodiment, each of the optical waveguides 502 and 503, which constitutes an optical deflection device, can be a slab optical waveguides formed by a material having an electro-optic effect.

As mentioned above, in the present embodiment, desired exit angles can be acquired by arranging the refraction index distribution lens 504 having different refraction indexes at the subsequent stage of the optical waveguides 502 and 503. Thus, the multibeam deflector according to a non-mechanical-optical deflection device can be achieved.

(Sixth Embodiment)

Figure 8:
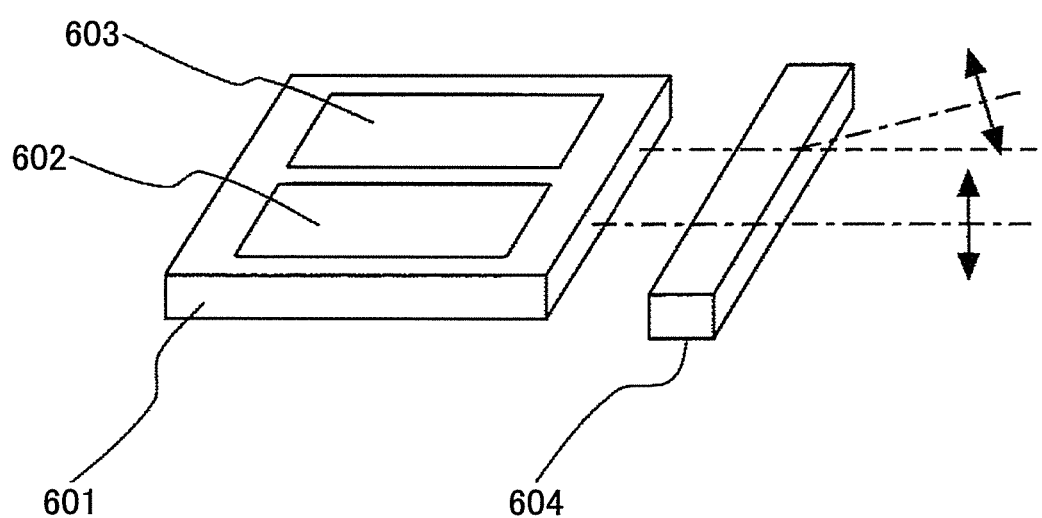
FIG. 8 is an illustrative perspective view of a multibeam deflector according to a sixth embodiment of the present invention.

FIG. 8 is an illustrative perspective view of a multibeam deflector according to a sixth embodiment of the present invention. The multibeam deflector according to the sixth embodiment is achieved by arranging a multi-lens array at a subsequent stage of cylindrical lenses as an output optical system.

Similar to the multibeam deflector illustrated in FIGS. 1A and 1E, the multibeam deflector according to the present embodiment includes a plurality of optical deflection devices provided in a single substrate 601. The optical deflection devices include optical waveguides 602 and 603, respectively. A multi-lens array 604 is arranged as an output optical system at a subsequent stage of the optical waveguides 602 and 603. The multi-lens array 604 has both a function to separate the beams output therefrom and a function to collimate the beams. Thus, desired exit angles can be acquired for the beams output from the optical waveguides 602 and 603 by changing the refraction indexes at portions of the multi-lens array 604 where the respective beams are passed.

Similar to the first embodiment, each of the optical waveguides 602 and 603, which constitutes an optical deflection device, can be a slab optical waveguides formed by a material having an electro-optic effect.

As mentioned above, in the present embodiment, desired exit angles can be acquired by arranging the multi-lens array 604 having different refraction indexes at the subsequent stage of the optical waveguides 602 and 603. Thus, the multibeam deflector according to a non-mechanical-optical deflection device can be achieved.

(Seventh Embodiment)

A description will be given below of a two-dimensional scanner according to a seventh embodiment of the present invention, which includes one of the beam deflectors according to the first through sixth embodiments mentioned above, and a scanning means or a scanning unit which scans a plurality of beams output from the beam deflector.

Figure 9A:
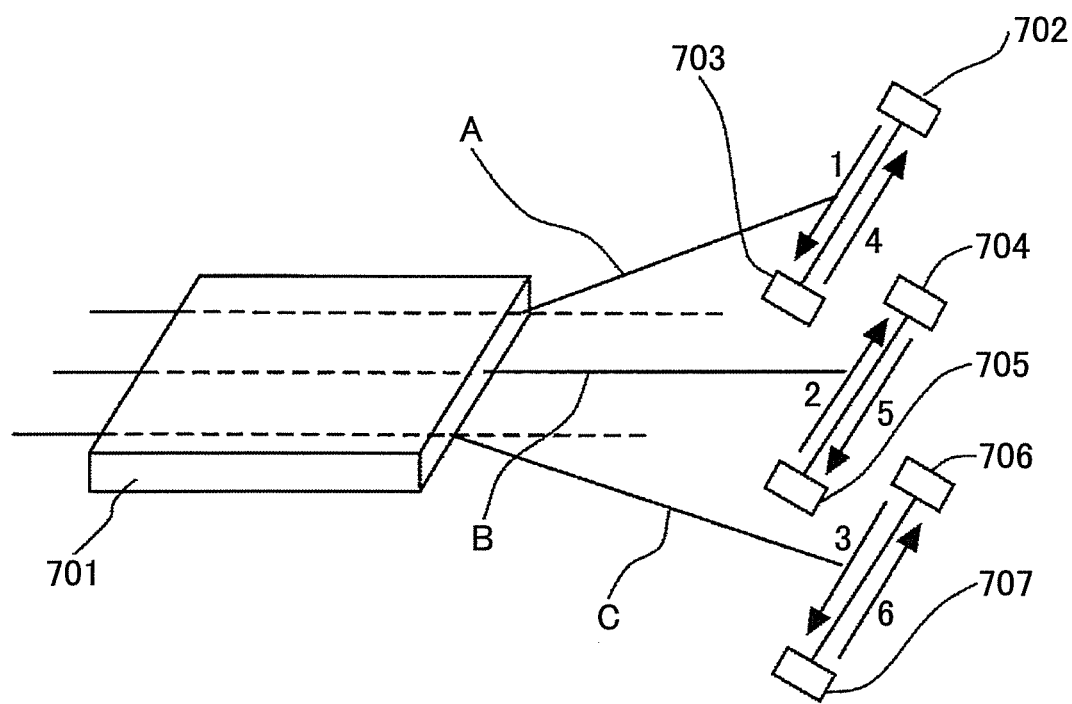
FIG. 9A is an illustrative perspective view of a two-dimensional scanner according to a seventh embodiment of the present invention.
Figure 9B:
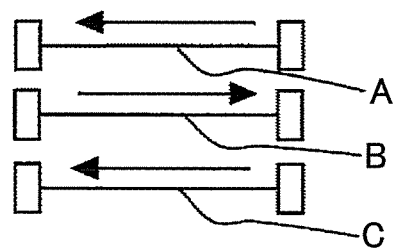
FIG. 9B is an illustration of deflection beams in the two-dimensional scanner.

FIG. 9A is an illustrative perspective view of the two-dimensional scanner according to the seventh embodiment of the present invention. FIG. 9B is an illustration of deflection beams in the two-dimensional scanner.

In the two-dimensional scanner illustrated in FIG. 9A, optical absorbers 702, 703, 704, 705, 706 and 707 are provided at ends of scan range of a plurality of deflected beams output from a multibeam deflector 701. In the two-dimensional scanner 701, the deflected beam A is scanned in a direction indicated by an arrow 1. When the deflected beam A reached the optical absorber 703, the deflected beam B is scanned in a direction indicated by an arrow 2. When the deflected beam B reached the optical absorber 704, the deflected beam C is scanned in a direction indicated by an arrow 3. When the deflected beam C reached the optical absorber 707, the deflected beam A is scanned in a direction indicated by an arrow 4. When the deflected beam A reached the optical absorber 702, the deflected beam B is scanned in a direction indicated by an arrow 5. When the deflected beam B reaches the optical absorber 705, the deflected beam C is scanned in a direction indicated by an arrow 6. Thus, a two-dimensional scan is realized by scanning the deflected beams A, B and C in the above-mentioned manner.

(Eighth Embodiment)

A description will be given below of a multibeam deflection module according to an eighth embodiment of the present embodiment. The multibeam deflection module includes one of the multibeam deflectors according to the first through sixth embodiments mentioned above or the two-dimensional scanner according to the seventh embodiment of the present invention.

Figure 10:
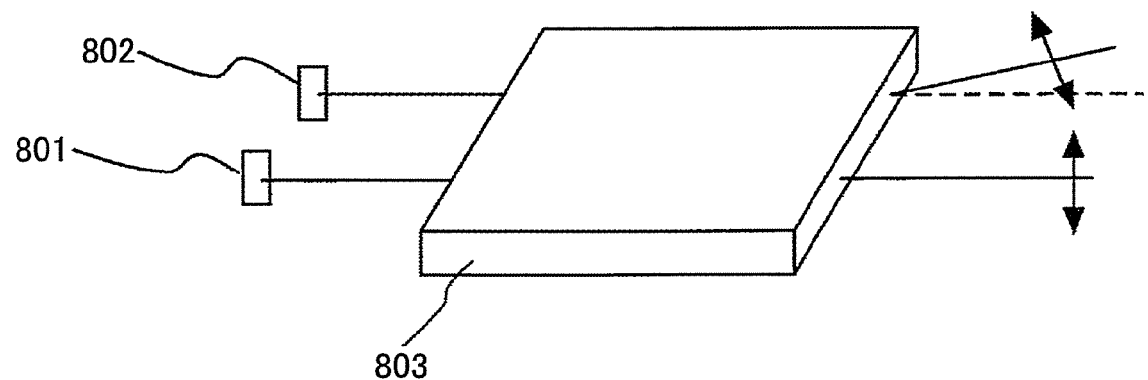
FIG. 10 is an illustrative perspective view of a multibeam deflection module according to an eighth embodiment of the present invention.

FIG. 10 is an illustrative perspective view of the multibeam deflection module according to the eighth embodiment of the present invention. The multibeam module includes a plurality of light sources 801 and 802 and a multibeam deflector 803, which is one of the multibeam deflectors according to the first through sixth embodiments.

In the multibeam deflection module illustrated in FIG. 10, beams output from the light sources 801 and 802 are incident on the multibeam deflector 803, and output from the multibeam deflector 803 at different exit angles. The light sources 801 and 802 may be semiconductor lasers having the same drive circuit or different drive circuits and the same energy supply source or different energy supply sources. There is no limitation in a laser wavelength and laser energy. The two-dimensional scanner according to the seventh embodiment may be used instead of the multibeam deflector 803.

Although not illustrated in FIG. 8, an input optical system including a collective lens may be provided in order to efficiently input the beams from the light sources 801 and 802 to the multibeam deflector 803. A collimate lens or a cylindrical lens may be suitable for such a collective lens.

(Ninth Embodiment)

Figure 11:
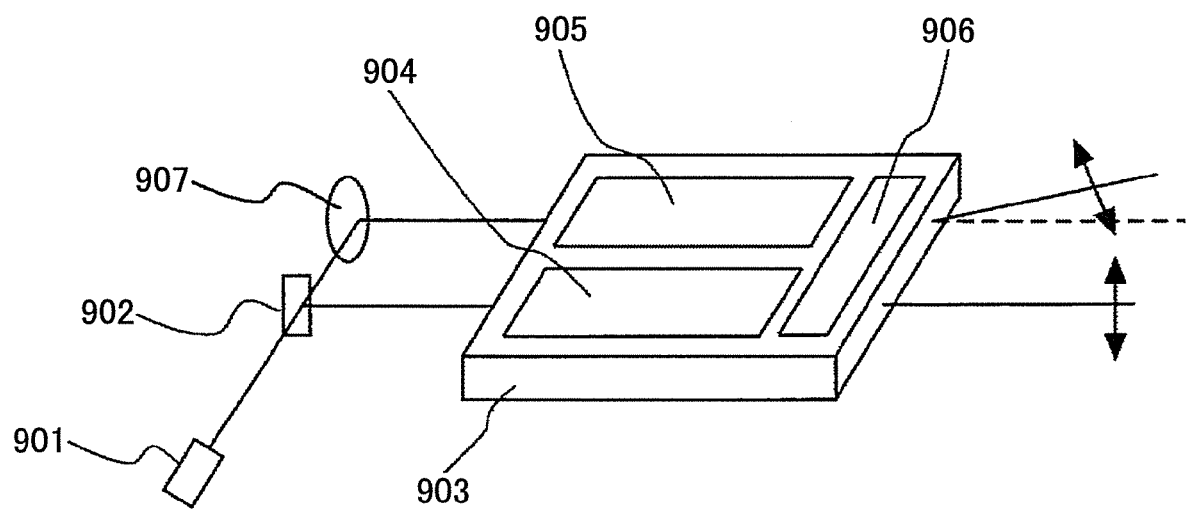
FIG. 11 is an illustrative perspective view of a multibeam deflection module according to a ninth embodiment of the present invention.

FIG. 11 is an illustrative perspective view of a multibeam deflection module according to a ninth embodiment of the present invention. The multibeam deflection module according to the ninth embodiment includes a light source 901, an optical branching element 902, and a multibeam deflector 903. The multibeam deflector 903 is one of the multibeam deflectors according to the first through sixth embodiments of the present invention.

In the multibeam deflection module illustrated in FIG. 11, the beam output from the light source 901 is branched by the optical branching element 902. The branched beams are incident on optical deflection devices 904 and 905 of the multibeam deflector 903, respectively. In the example illustrated in FIG. 11, one of the branched beams is directly incident on the optical deflection device 904, and the other of the branched beams is deflected by a mirror 907 and incident on the optical deflection device 905. A half-mirror or a prism may be used as the optical branching element 902. The beam of incident on the optical deflection device 904 and the beam incident on the optical deflection device 905 are output from an output optical system 906 of the multibeam deflector 903.

In the multibeam deflection module illustrated in FIG. 11, the optical branching element 902 divides the energy intensity of the beam output from the light source 901 in order to branch the beam. The branched beams output from the optical branching element 902 are incident on the multibeam deflector 903, and are output from an output optical system of the multibeam deflector 903 at different exit angles.

The two-dimensional scanner according to the seventh embodiment of the present invention may be used instead of the multibeam deflector 903. Although not illustrated in FIG. 11, a collective lens such as a collimate lens or a cylindrical lens may be provided at a preceding stage or a subsequent stage of the optical branching element 902 in the input optical system in order to efficiently input the beam from the light source 901 to the multibeam deflector 903.

(Tenth Embodiment)

Figure 12:
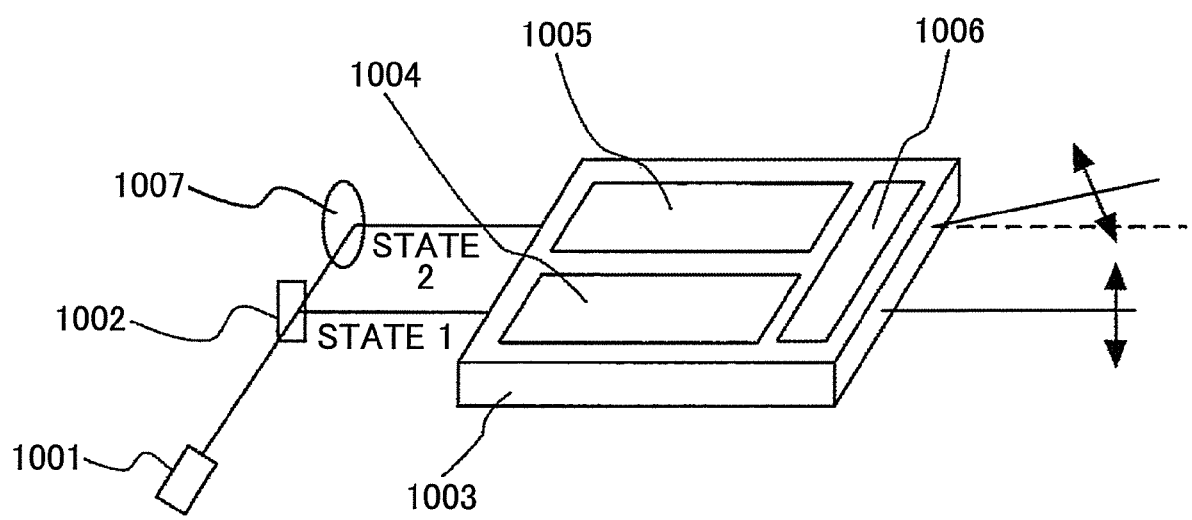
FIG. 12 is an illustrative perspective view of a multibeam deflection module according to a tenth embodiment of the present invention.

FIG. 12 is an illustrative perspective view of a multibeam deflection module according to a tenth embodiment of the present invention. The multibeam deflection module according to the tenth embodiment includes a light source 1001, an optical switch 1002, and a multibeam deflector 1003. The multibeam deflector 1003 is one of the multibeam deflectors according to the first through sixth embodiments of the present invention.

In the multibeam deflection module illustrated in FIG. 12, the state of the beam output from the light source 1001 is changed into a state 1 or a state 2 by the optical switch 1002 in order to selectively input the beam into optical deflection devices 1004 and 1005 of the multibeam deflector 1003. That is, in the example illustrated in FIG. 12, the beam of the state 1 is directly incident on the optical deflection device 1004, and the beam of the state 2 is deflected by a mirror 1007 and incident on the optical deflection device 1005. The beam of the state 1 incident on the optical deflection device 1004 and the beam of the state 2 incident on the optical deflection device 1005 are output from an output optical system 1006 of the multibeam deflector 1003.

A MEMS switch having a micro-machine structure, for example, may be used as the optical switch 1002. The MEMS switch deflects the beam by a mirror in a first direction when the mirror is at a first reflection angle or in a second direction when the mirror is at a second reflection angle. For example, when the mirror is at the first reflection angle (corresponding to the state 1), the beam is deflected to and incident on the optical deflection device 1004, and when the mirror is at the second reflection angle (corresponding to the state 2), the beam is deflected to and incident on the optical deflection device 1005.

The two-dimensional scanner according to the seventh embodiment of the present invention may be used instead of the multibeam deflector 1003. Although not illustrated in FIG. 12, a collective lens such as a collimate lens or a cylindrical lens may be provided at a preceding stage or a subsequent stage of the optical switch 1002 in the input optical system in order to efficiently input the beam from the light source 1001 to the multibeam deflector 1003.

The present invention is not limited to the specifically disclosed embodiments, and variations and modifications may be made without departing from the scope of the present invention.

The present application is based on Japanese priority applications No. 2009-212927 filed on Sep. 15, 2009 and No. 2010-203939 filed on Sep. 13, 2010, the entire contents of which are hereby incorporated herein by reference.

What is claimed is:

1. A multibeam deflector comprising:
a plurality of optical deflection devices aligned in a first direction on a single substrate, each of the optical deflection devices being provided for each of a plurality of optical beams and including a slab optical waveguide formed by a material having an electro-optic effect so as to deflect the optical beams incident thereon so that the optical beams simultaneously output from the plurality of optical deflection devices travel in parallel direction; and
an output optical system configured to simultaneously receive the optical beams output from said optical deflection devices at different positions and change a direction of an optical axis of each of the optical beams output from said output optical system independently, wherein the output optical system includes a plurality of cylindrical lenses, each of the plurality of cylindrical lenses being provided at a subsequent position in a second direction in which the optical beams travel from the optical deflection devices to the cylindrical lenses, the second direction being parallel to optical axes of the optical beams, each of the plurality of the cylindrical lenses being located at a different position in a direction perpendicular to the first and second directions.

2. The multibeam deflector as claimed in claim 1, wherein said output optical system includes a plurality of optical systems each containing a lens having a convex surface and a flat surface so that the optical beams output from said optical deflection devices are incident on the optical systems, respectively;
every possible adjacent pair in said plurality of optical systems are arranged at relatively different positions in a direction perpendicular to optical axes of the optical beams incident on the optical systems or a direction parallel to the optical axes of the optical beams incident on the optical systems so that a difference in exit angles between the optical beams output from the adjacent pair of optical systems is larger than zero degree and equal to or smaller than 5 degrees and a spread angle of each of the optical beams output from the adjacent pair of optical systems is larger than zero degree and equal to or smaller than 10 degrees; and
a distance between the positions of the two optical systems is equal to or smaller than 1 mm in the direction perpendicular to the optical axis and equal to or smaller than 5 mm in the direction perpendicular to the optical axis.

3. The multibeam deflector as claimed in claim 1, wherein said output optical system includes:
a first optical system containing a lens having a convex surface and a flat surface in order to control a spread angle of each of the optical beams output from said optical deflection devices; and
a second optical system arranged at a position where the optical beams output from said first optical system are input thereto in order to separate the optical beams output from said first optical devices.

4. The multibeam deflector as claimed in claim 1, wherein said output optical device separates the optical beams output from said optical deflection devices by changing exit angles of the optical beam or changing positions at which the optical beams are output.

5. The multibeam deflector as claimed in claim 2, wherein each of said plurality of output optical systems is a collimating lens.

6. The multibeam deflector as claimed in claim 3, wherein said second optical system includes a plurality of mirrors having different reflection angles from each other.

7. The multibeam deflector as claimed in claim 3, wherein said second optical system includes a plurality of diffraction gratings having different diffraction angles from each other.

8. The multibeam deflector as claimed in claim 3, wherein said second optical system includes a polarization rotation device and a polarization prism.

9. The multibeam deflector as claimed in claim 3, wherein said second optical system is a refractive index distribution lens having different refractive index slopes for the respective optical deflection devices.

10. The multibeam deflector as claimed in claim 3, wherein said second optical system is a subwavelength surface grating.

11. The multibeam deflector as claimed in claim 2, wherein each of said optical systems is a collimating lens.

12. The multibeam deflector as claimed in claim 1, wherein said output optical system includes an optical element having a function to separate the optical beams output from said output optical system from each other and a function to collimate the optical beams output from said output optical system.

13. The multibeam deflector as claimed in claim 12, wherein said optical element is one of a cylindrical lens, a refraction index distribution lens, a multi-lens array and a subwavelength surface grating.

14. A two-dimensional scanner comprising:
a multibeam deflector as claimed in claim 2; and
a plurality of optical absorbers two-dimensionally arranged at positions where the optical beams output from said multibeam deflector are input thereto.

15. A multibeam deflection module comprising:
a multibeam deflector as claimed in claim 2; and
an input optical system including a collecting lens that outputs optical beams to be input to said multibeam deflector.

16. The multibeam deflection module as claimed in claim 15, wherein said collecting lens is a collimating lens or a cylindrical lens.

17. The multibeam deflection module as claimed in claim 15, wherein said input optical system includes a plurality of light sources that output the optical beams to be output from said collecting lens.

18. The multibeam deflection module as claimed in claim 15, wherein said input optical system includes an optical branching element that branches an optical beam into a plurality of branched optical beams so that one of the branched optical beams is incident on one of said multibeam deflectors and the other of the branched optical beams is incident on the other of the multibeam deflectors.

19. The multibeam deflection module as claimed in claim 15, wherein said input optical system includes an optical switch having a mirror configured to change a direction of an optical beam so that the optical beam is selectively incident on one of the optical deflection devices.

20. The multibeam deflector as claimed in claim 1, wherein the each of the plurality of the cylindrical lenses is located at a different position in a direction of thickness of the single substrate.

* * * * *